United States Patent [19]

Hayashi et al.

[11] Patent Number: 5,036,510
[45] Date of Patent: Jul. 30, 1991

[54] OPTICAL RECORDING DISK

[75] Inventors: Ryutaro Hayashi; Toshikazu Yoshino; Yukio Kimura, all of Tokorozawa, Japan

[73] Assignee: Pioneer Electronic Corporation, Tokyo, Japan

[21] Appl. No.: 199,203

[22] Filed: May 26, 1988

[30] Foreign Application Priority Data

Jul. 8, 1987 [JP] Japan .......................... 62-104962[U]

[51] Int. Cl.$^5$ ..................... G11B 3/70; G11B 5/84
[52] U.S. Cl. ................... 369/283; 369/286; 369/288
[58] Field of Search ............ 369/284, 286, 288, 292; 428/65, 424.4, 900; 346/135.1

[56] References Cited

U.S. PATENT DOCUMENTS

| | | | |
|---|---|---|---|
| 4,683,562 | 7/1987 | Matsui et al. | 369/286 |
| 4,716,063 | 12/1987 | Uehara et al. | 369/288 |
| 4,871,601 | 10/1989 | Miura et al. | 369/286 |
| 4,871,602 | 10/1989 | Miura et al. | 369/286 |

FOREIGN PATENT DOCUMENTS

| | | | |
|---|---|---|---|
| 60-258744 | 12/1985 | Japan | 369/283 |
| 63-171443 | 7/1988 | Japan | 369/283 |

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

An optical recording disk of air sandwich type includes a transparent disk carrying a transferring layer and a protection disk which are symmetrically disposed with respect to a central plane between the transparent and protection disks, the protection disk being the same as the transparent disk in material and shape and having a dummy layer which is the same as the transferring layer in material and shape.

6 Claims, 1 Drawing Sheet

OPTICAL RECORDING DISK

BACKGROUND OF THE INVENTION

1. Field of the Invention

The present invention relates to an optical information recording disk.

2. Description of the Prior Art

Conventionally, it is known that a DRAW (Direct Read After Write) type of an optical recording disk is constructed in the form of the so-called air sandwich structure as shown in FIG. 1. This optical recording disk usually comprises a transparent disk 1 and a protection disk 2 each being made of plastic materials such as acrylic resin, polycarbonate resin, etc. A major surface of the transparent disk 1 is provided with a transferring layer 3 made of an ultraviolet ray setting resin for carrying pre-addresses and pre-grooves. Each of the pre-addresses is a series of very minute pits representing an address assigned to a pre-groove following thereto. The pre-groove is a shallow groove extending circumferentially on the transparent disk 1. A recording layer 4 made of a material having a property of light energy absorption such as an organic cyanine dye, is formed on the major surface of the transferring layer 3. A light spot of a laser beam may be aligned onto a selected pre-groove so as to write and/or read any information on the recording layer 4 at the selected pre-groove while referring to the pre-address corresponding to the selected pre-groove. The transparent disk 1 and the protection disk 2 are adhered by an adhesive agent layer 7 via inner and outer spacers 5 and 6 so as to face each other while the recording layer 4 being oriented inwardly.

In the prior optical recording disk, it was desired to make thinner the respective elements of the optical recording disk in order to cause a recording light beam to pass efficiently through the transparent disk 1, and further to facilitate the handling of the optical recording disk. However, it is difficult to obtain the rigidity of such a thin disk enough for avoiding any deformation of the thin disk during its manufacturing process and/or usage.

Therefore, another prior optical recording disk having a construction as shown in FIG. 2 has been developed. This optical recording disk comprises the transparent disk 1 and the protection disk 2 between which a reinforcement disk 8 is disposed so as to accomplish a rigidity sufficient for preventing from the deformation thereof. In the optical recording disk as shown in FIG. 2, the inner and outer spacers 5 and 6 are integrated with each other by the reinforcement disk 8.

However, even with the above-mentioned arrangement, the warp of this disk still occurs due to changes of temperatures and humidities under various using conditions, because the rate of swelling of the transferring layer 3 made of the cured ultraviolet ray setting resin is lower than that of the transparent disk 1 made of acrylic resin. Since furthermore the coefficients of thermal expansions of the transparent disk 1, the protection disk 2 and reinforcement disk 8 are different from each other, it has been a problem that the warp of the optical recording disk occurs due to changes of temperatures.

SUMMARY OF THE INVENTION

An object of the present invention is to overcome the above-described problem and to provide an optical recording disk which stands against any warp.

According to the present invention, there is provided with an optical recording disk which comprises: a transparent disk carrying a transferring layer; a protection disk; a recording layer disposed on said transferring layer; and inner and outer annular spacers being sandwiched via an adhesive agent layer between said transparent disk and said protection disk so as to maintain a cavity in which said recording layer faces inwardly, wherein said protection disk is substantially the same as said transparent disk in material and shape; and a dummy layer being the same as said transferring layer in material and shape is formed on an inner surface of said protection disk.

DESCRIPTION OF THE PREFERRED EMBODIMENT

Figure 3:
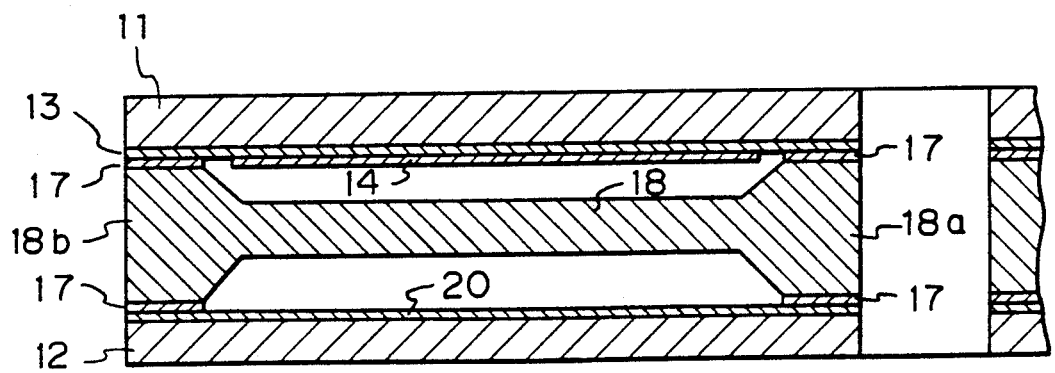
FIG. 3 is an enlarged partial sectional view of an optical recording disk according to the present invention.

The optical recording disk according to the present invention comprises a transparent disk 11 made of acrylic resin and a protection disk 12 made of the same, as shown in FIG. 3. These disks may be made of polycarbonate resin which is transparent. A transferring layer 13 carrying pre-addresses and pre-grooves for the tracking servo of light beams is formed on the major surface of the transparent disk 11. The transferring layer 13 is formed through the following process: Firstly, a photo-curable liquid such as an ultraviolet ray setting resin which is cured by radiation of light, is provided on a stamper carrying reverse shapes of predetermined pre-addresses and pre-grooves on its major surface. Sequentially, the transparent disk 11 is overlaid on the photo-curable liquid to spread between the stamper and the transparent disk in the form of a thin layer. The photo-curable liquid is then cured under the ultraviolet ray and secured onto the transparent disk 11 thereby to become the transferring layer 13. The transparent disk 11 combined with the transferring layer 13 is removed from the stamper. Sequentially, the so-called spin coat process is performed while dropping a solution of the cyanine dye on the major surface of the transferring layer carrying the predetermined pre-addresses and pre-grooves, and then a obtained this film of the cyanine dye is dried. In this way, a recording layer 14 made of an organic cyanine dye is directly formed on the transferring layer 13.

In this embodiment, the protection disk 12 is made of the same material as of the transparent disk 11 and formed with the same thickness and diameter as with the transparent disk 11. On the major surface of the protection disk 12, a dummy layer 20 made of the same material of the transferring layer 13 is formed with the same thickness as the transferring layer 13. The dummy layer 20 may carry thereon the pre-address and/or the pre-groove, if it is preferred. The dummy layer 20 may be otherwise provided with a mirror surface so as not to carry any pre-addresses and pre-grooves, by means of using of a stamper carrying a flat plane with the mirror grinding.

The transparent disk 11 and the protection disk 12 are adhered by an adhesive agent layer 17 via a reinforcement disk 18 which has circumferentially extending inner and outer projections 18a and 18b acting as inner and outer spacers so that the recording layer 14 and the dummy layer 20 faces each other via a cavity therebetween. The adhesive agent layer 17 is made of polyurethane adhesive which is spread on the projections 18a and 18b in fluid state, and has a pertinent flexibility after cured.

With the construction mentioned above, it can be said that the protection disk 12 coupled with the dummy layer 20 can stand against any possible warp of the transparent disk 11 combined with the transferring layer 13, thereby to keep flatness of the whole of the optical recording disk, even if the rate of swelling of the cured photo-curable liquid differs from that of the acrylic resin, and further the coefficient of thermal expansion of reinforcement disk 18 differs from that of the transparent disk 11.

It is appreciated that the optical recording disk according to the present invention is symmetric in shape and substance with respect to a central plane parallel to the transparent disks 11 and 12. Accordingly, the optical recording disk according the present invention is substantially fee from any warp even under the conditions of high temperature and humidity.

Figure 1:
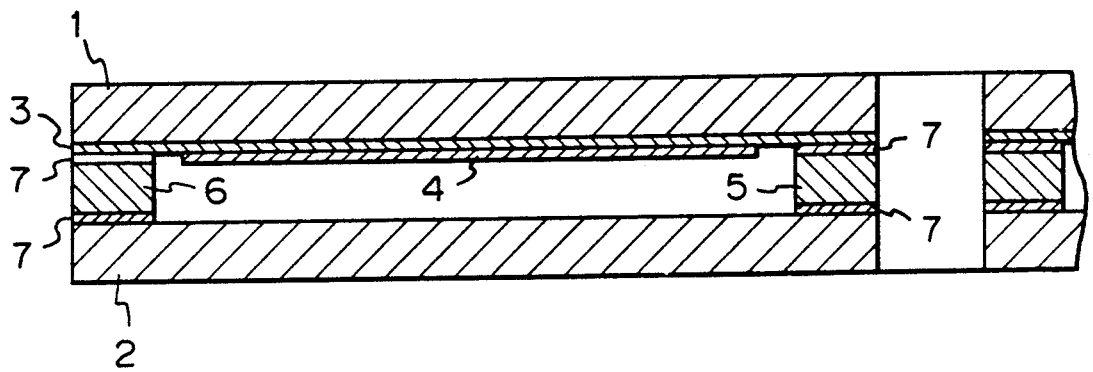
FIGS. 1 and 2 are enlarged partial sectional views of the optical recording disks of the prior arts.
Figure 2:
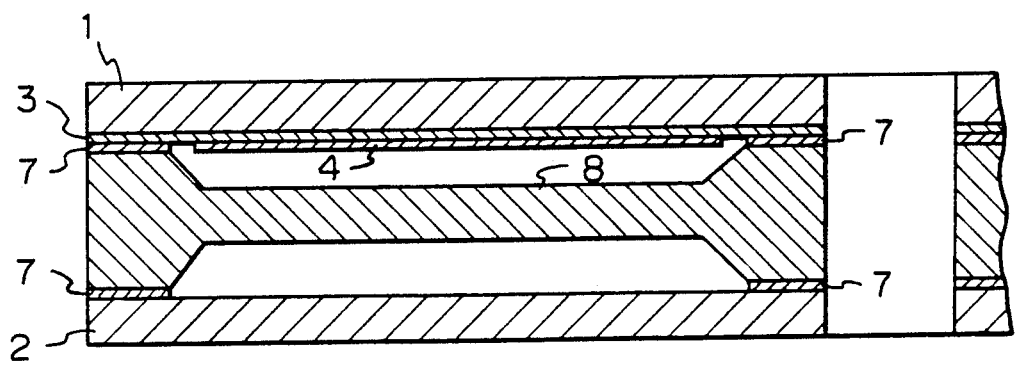

It is further to be understood that the reinforcement disc 18 may be replaced by such inner and outer annular spacers as shown in FIG. 1, if desired.

What is claimed is:

1. A single side optical recording disk comprising:
   a transparent disk;
   a transferring layer formed on one side whole surface of the transparent disk and carrying pre-addresses and pre-grooves for the tracking servo of a light beam projected through the transparent disk;
   a recording layer formed on a surface of said transferring layer;
   a protection disk;
   a dummy layer formed on one side whole surface of said protection disk;
   annular spacers being sandwiched by an adhesive layer between said transferring layer and said dummy layer so as to maintain a cavity between the transparent disk and the protection disk;
   said recording layer and said dummy layer facing inward to said cavity;
   said protection disk and said transparent disk being of the same material and thickness, and said dummy layer and said transferring layer being of the same material and thickness;
   a mirror surface layer formed on a surface of said dummy layer facing inward to said cavity; and
   a reinforcement disk formed integrally with the outer spacers and extending through a central portion of said cavity midway between said transparent disk and said protection disk.

2. An optical recording disk according to claim 1 wherein, said recording layer is made of an organic cyanine dye.

3. An optical recording disk according to claim 1 wherein, said transparent disk is made of acrylic resin or polycarbonate resin.

4. A single side optical recording disk comprising:
   a transparent disk;
   a transferring layer formed on one side whole surface of the transparent disk and carrying pre-addresses and pre-grooves for the tracking servo of a light beam projected through the transparent disk;
   a protection disk;
   annular spacers being sandwiched by an adhesive layer between said transparent disk and said protection disk so as to maintain a cavity between the transparent disk and the protection disk;
   a recording layer formed on a surface of said transferring layer facing inwardly to said cavity;
   a dummy layer formed on a surface of said protection disk facing inward to said cavity;
   said protection disk and said transparent disk being of the same material and thickness, and said dummy layer and said transferring layer being of the same material and thickness;
   a mirror surface layer formed on a surface of said dummy layer facing inward to said cavity; and
   a reinforcement disk formed integrally with the outer spacers and extending through a central portion of said cavity midway between said transparent disk and said protection disk.

5. The optical recording disk of claim 4, wherein said transferring layer is formed of a photo-curable liquid cured by radiation of light and which is stamped onto said transparent disk by a stamper carrying reverse shapes of the pre-addresses and pre-grooves.

6. The optical recording disk of claim 5, wherein said recording layer comprises organic cyanine dye directly formed on the transferring layer.

* * * * *